(12) United States Patent
Tanaka

(10) Patent No.: US 8,477,349 B2
(45) Date of Patent: Jul. 2, 2013

(54) INFORMATION PROCESSING APPARATUS, AND NETWORK SETTING METHOD

(75) Inventor: Satoshi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 12/715,272

(22) Filed: Mar. 1, 2010

(65) Prior Publication Data

US 2010/0238477 A1  Sep. 23, 2010

(30) Foreign Application Priority Data

Mar. 23, 2009  (JP) ................................. 2009-069562

(51) Int. Cl.
*G06F 3/12* (2006.01)
*G06K 15/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

2006/0203282 A1* 9/2006 Iwai .............................. 358/1.15

FOREIGN PATENT DOCUMENTS

| JP | 2005-174246 A | 6/2005 |
| JP | 2006-185251 A | 7/2006 |
| JP | 2006-350437 A | 12/2006 |
| JP | 2007-072609 A | 3/2007 |
| JP | 2009-151618 A | 7/2009 |

* cited by examiner

*Primary Examiner* — Dov Popovici
(74) *Attorney, Agent, or Firm* — Canon USA Inc IP Division

(57) ABSTRACT

A print window is displayed by an application, and a printer name is selected by a user. When the printer name is selected, OS loads printer driver to cause the printer driver to execute print processing. Then, the printer driver performs change processing of an output port in initialization processing when needed, and outputs printing information to an image forming apparatus.

10 Claims, 12 Drawing Sheets

| 801 — NETWORK INFORMATION | IP ADDRESS OF PC | : 192.168.11.50 | —802 |
| --- | --- | --- | --- |
| | SUBNET MASK | : 255.255.255.0 | —803 |
| | GATE WAY | : 192.168.11.2 | —804 |
| OUTPUT PORT INFORMATION | | : IP_192.168.11.11 | —805 |

| 811 — NETWORK INFORMATION | IP ADDRESS OF PC | : 192.168.100.5 | —812 |
| --- | --- | --- | --- |
| | SUBNET MASK | : 255.255.255.0 | —813 |
| | GATE WAY | : 192.168.100.1 | —814 |
| OUTPUT PORT INFORMATION | | : IP_192.168.100.100 | —815 |

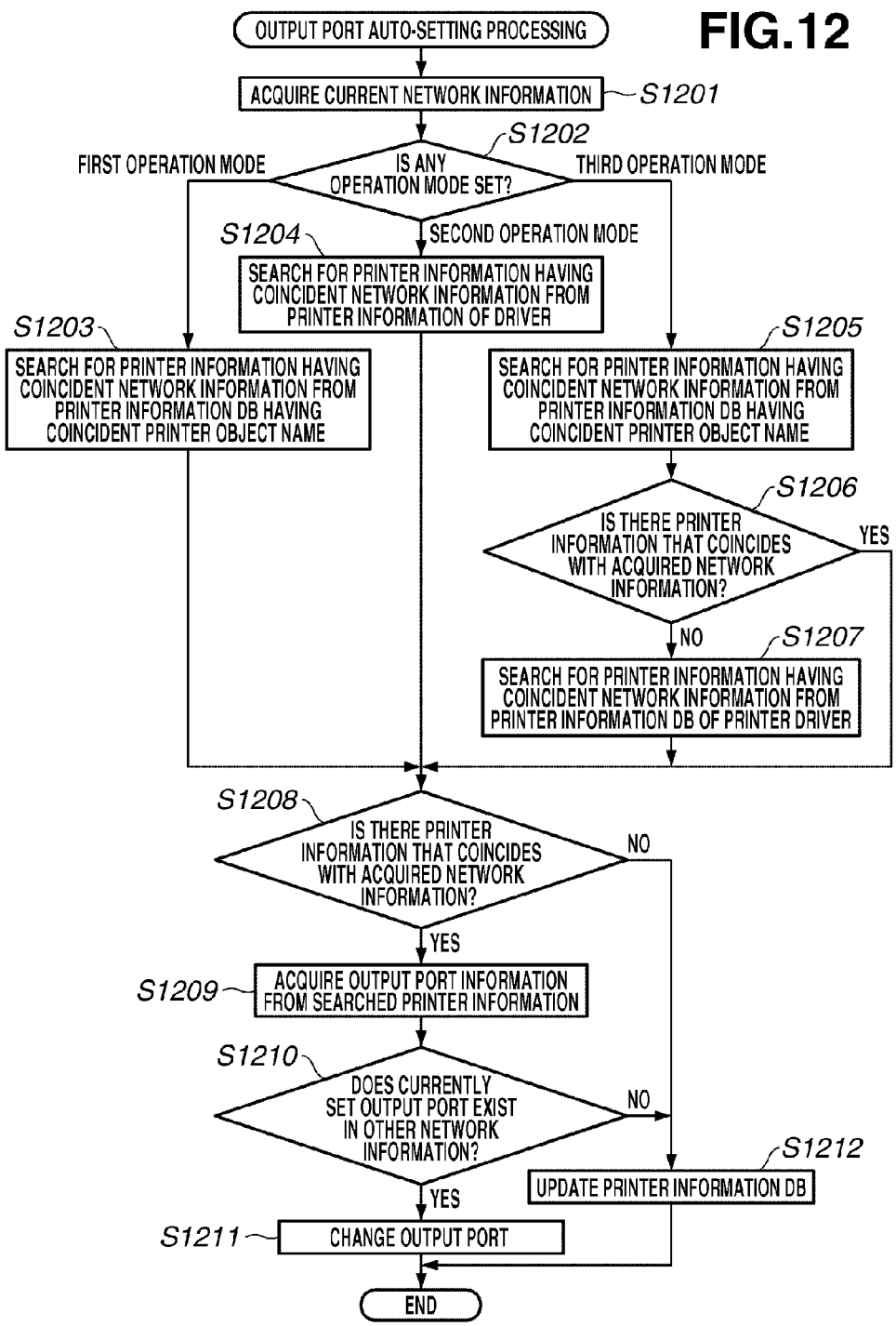

INFORMATION PROCESSING APPARATUS, AND NETWORK SETTING METHOD

BACKGROUND OF THE INVENTION

1. Field of the Invention

The present invention relates to an information processing apparatus for performing network settings for an image forming apparatus.

2. Description of the Related Art

In recent years, since a system, in which a portable information processing apparatus is utilized, like a notebook type personal computer (PC), a super mobile (SM) PC, has been constructed, each user can select a printer from a network and can print desired data. In the case of such a system environment, each user may carry a PC with the user, while moving around living rooms, and connect it to a network of a move destination.

The user may carry a PC when moving from, for example, a network environment where normal work is performed, to a network environment such as conference rooms or the like. Then, the user may connect it to the network of the move destination, and, if necessary, select a printer on the network of the move destination, to perform print processing. In this way, the user often utilizes the PC and the printers that are connected to a plurality of networks, and in general, the printers connected to respective networks are used when performing printing.

In this case, in order for the user to cause a printer that the user desires to use to perform printing, it is necessary that a printer driver suitable for the printer intended to print is installed on the PC that the user carries with, and that a printer object is correctly set. In this case, setting of the printer object refers to output port setting (e.g., IP address) corresponding to an output printer.

In a state where the printer driver is not installed on the PC that the user carries with, or in the state where setting of the printer object is not correctly performed, the user cannot print necessary information from a printer located in the vicinity of the move destination. Therefore, Japanese Patent Application Laid-Open No. 2006-185251 discusses a method for automatically installing the printer driver and setting the printer object, when change of connected network is detected.

However, according to the conventional technology, a user connects a PC to a network at a destination where the user moves to, and after that, at a time of recognizing that the network environment has been changed, a printer driver suitable for the connected network is installed and setting change of printer object is performed. Therefore, there is a problem that, even if the user connects the PC, which the user has carried with, onto the network of the move destination, setting change of the printer object is eventually performed, even in the case where printing is not actually executed.

SUMMARY OF THE INVENTION

The present invention is directed to an information processing apparatus, and a network setting method capable of automatically performing setting of an output port only for a printer that performs printing at a timing of printing.

According an aspect of the present invention, an information processing apparatus for outputting printing information on an image forming apparatus connected to a network using printer driver, the information processing apparatus includes an acquisition unit configured to acquire network information from connected network, after printing has been instructed, a storage unit configured to store network information that the acquisition unit has acquired, and output port information that has been set for printer driver as printer information associated with printer name, a determination unit configured to determine whether network information that the acquisition unit has acquired is stored in the storage unit as the printer information associated with printer name selected by a user, and a changing unit, if the determination unit determines that the network information is stored in the storage unit, configured to change output port information set in the printer driver to output port information acquired from the printer information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates data structure of printer information.

FIG. 12 is a flowchart illustrating a data processing procedure of the information processing apparatus.

DESCRIPTION OF THE EMBODIMENTS

Various exemplary embodiments, features, and aspects of the invention will be described in detail below with reference to the drawings.

Figure 1A:
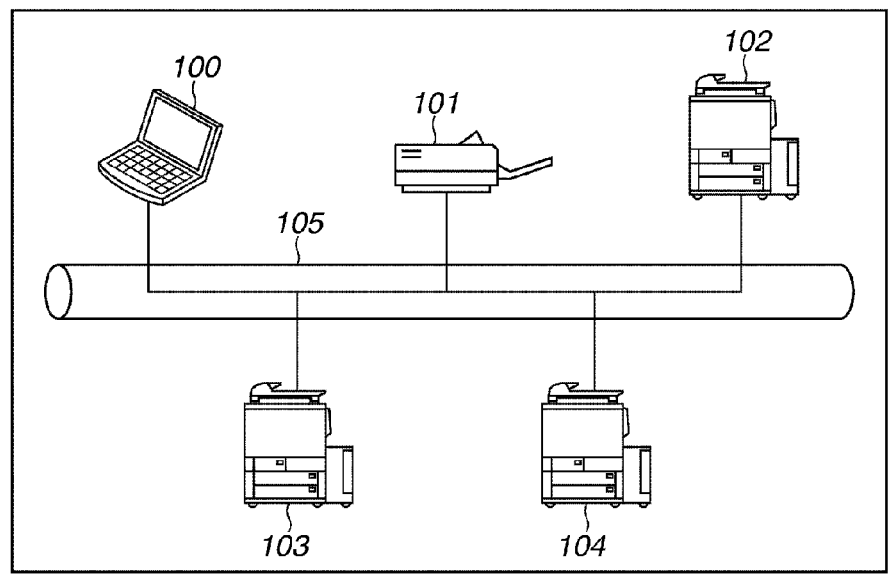
FIG. 1 is a block diagram illustrating a configuration of a print processing system.
Figure 1B:
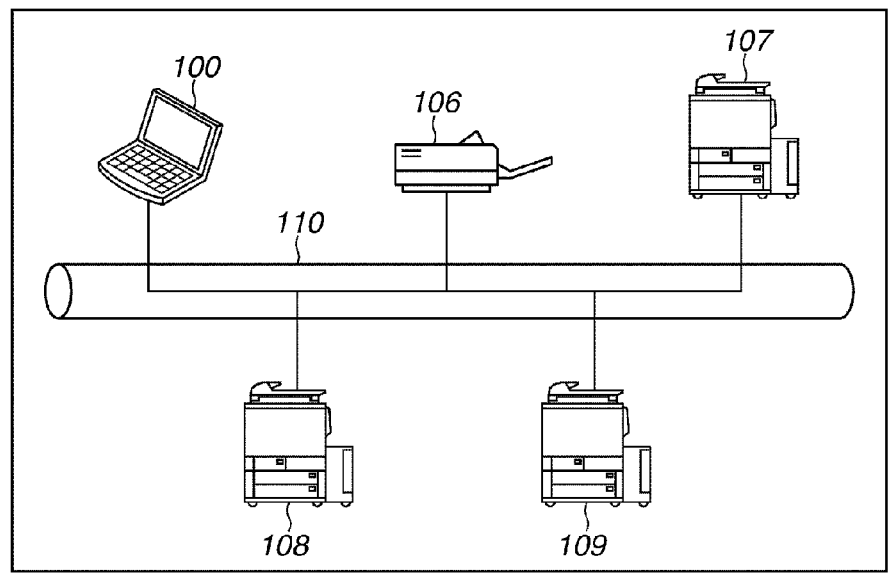

FIGS. 1A and 1B are block diagrams illustrating a configuration of a print processing system including an information processing apparatus according to the present exemplary embodiment. In the present exemplary embodiment, an example of a print processing system, in which a plurality of printers are connected to independent networks, respectively, is illustrated as an example of the image forming apparatus. Alternatively, in place of the printers, a plurality of multifunction peripherals (MFPs) for performing multi-function processing may be connected.

FIG. 1A illustrates a state in which a PC 100 serving as an information processing apparatus is connected to a first network 105. FIG. 1B illustrates a state in which a computer similarly serving as an information processing apparatus to a second network 110. In other words, the print processing system is configured so that, when a user moves carrying the PC 100 with, connects it to different networks, selects a printer on each network, the user can output print jobs. Although the example illustrates the case where the computers (hereinafter, referred to as PCs) 100 are constituted by a portable notebook PC, and a small-sized SMPC, the present invention is applicable to the case where the computers 100 are constituted by desktop type computers.

In FIGS. 1A and 1B, the PCs 100 are connected to a first network 105 and a second network 110 described below via a network cable such as Ethernet (registered trademark), and are capable of communicating with the printers 101 to 104, and 106 to 109 described below.

The PC 100 is capable of executing various programs such as installed application programs or the like, and is mounted with a printer driver having a function of converting print data into printer language corresponding to a printer. Further, the printer driver includes a region for storing printer information described below, and has a function of storing and managing the printer information for each printer object name created when printing is executed.

Further, in the present exemplary embodiment, the PC 100 is to support a plurality of printer drivers. In other words, if the printer drivers of the printers connected to the network are installed, and printing is performed using an application by the printer that the user uses, then the PC 100 is configured so that printing is executable with the printer that the user has selected.

More specifically, the PC 100 is configured so that the printer drivers associated with the printer names of respective printers 101 to 104, and 106 to 109 can be installed in the PC 100, and the a printer driver of the printer name that the user has selected will be installed.

Further, there may be a case where printers having identical printer names are connected, and also a case where printers having same drivers but different printer names are installed as imaginary printers, among the printers connected to the first network 105 and the second network 110.

In this case, "different printer names" can be installed because it is possible to register identical physical printers and yet having different print settings as imaginary printers. In other words, it is possible for users to register identical physical printers and yet imaginary printers with different settings of functions in arbitrary number of sets, and use these physical printers in different way according to their functions.

Further, the printers 101 to 104, and the printers 106 to 109 are connected to either of the first network 105 or the second network 110 described below via network interfaces not illustrated.

The printers 101 to 104, 106 to 109 analyze print jobs including print data transmitted from the PC 100, convert pages one by one into dot image data to print. Therefore, in the present exemplary embodiment, the functions of respective printers 101 to 104, 106 to 109 may be different. In other words, in some cases, print functions may be different from one another, and print settings may be different resulting from connecting optional devices and the like. Further, it is possible to cause, for example, a multi-function peripheral (MFP), in which other functions are expanded in addition to the printer functions, to function as an output apparatus of the information processing apparatus according to the present invention.

The PC 100 and the printers 101 to 104 are connected to the first network 105. Further, as a user moves while carrying the PC 100 for attending a conference, for example, it is configured so that, when the user connects the PC 100 to the second network 110, the user can select the printers 106 to 109 connected to the second network 110. A setting processing of the printers along with network connection change according to the present exemplary embodiment will be described in detail below.

Further, the first network 105 illustrated in FIG. 1A and the second network 110 illustrated in FIG. 1B are different from each other in terms of network address and subnet mask. In other words, in the present exemplary embodiment, the first network 105 and the second network 110 have system environments not physically connected to each other.

Figure 2:
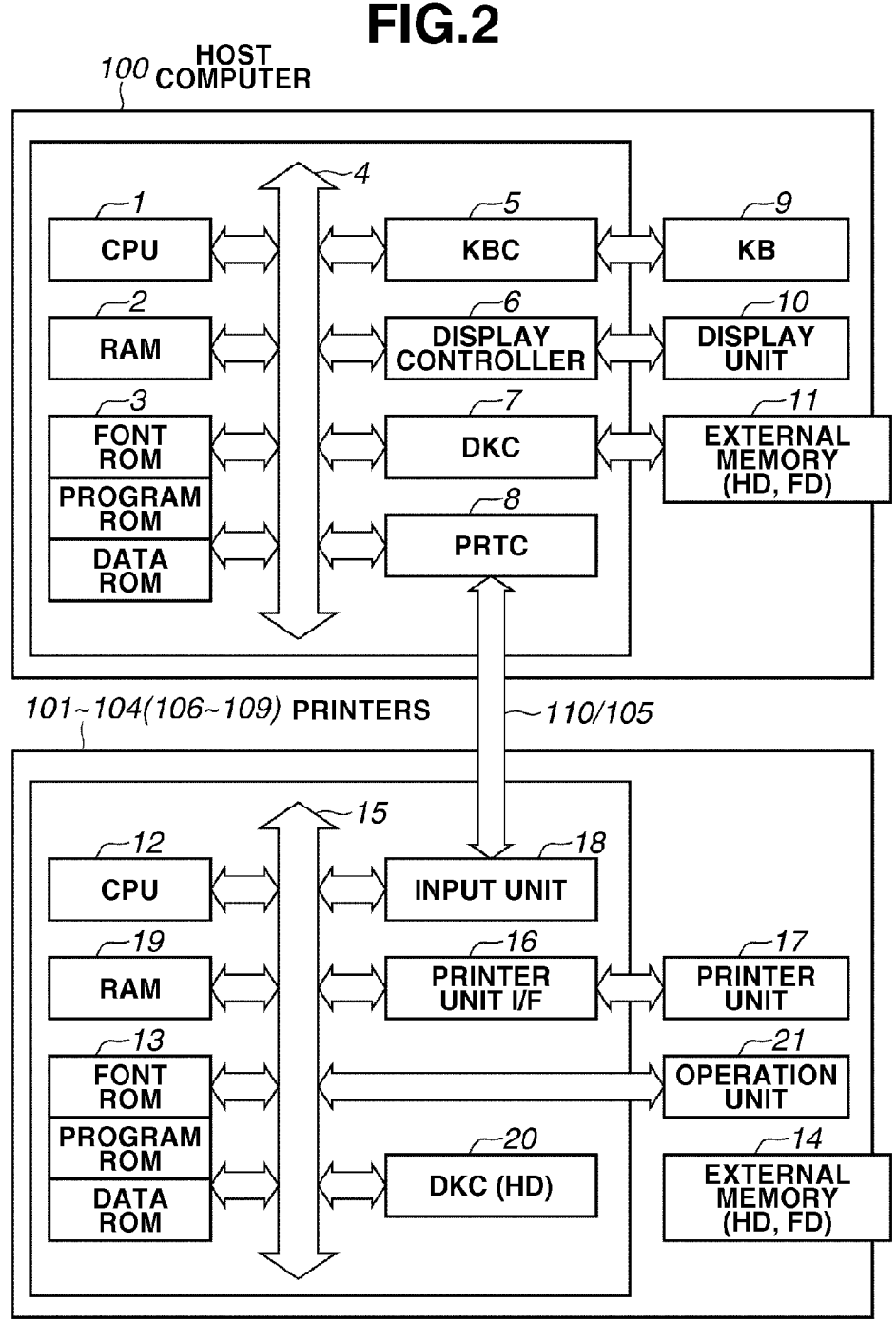
FIG. 2 is a block diagram illustrating a hardware configuration of a print processing system.

FIG. 2 is a block diagram illustrating a hardware configuration of a print processing system according to the present exemplary embodiment. A single device, or a system including a plurality of devices, or a system in which connection and processing are performed via a network such as a local area network (LAN), a wide area network (WAN), can be used, as long as each can execute the functions of the present invention.

In a host computer 100 illustrated in FIG. 2, a central processing unit (CPU) 1 executes document processing, in which figures, images, characters, tables (including, e.g., spreadsheet) and the like are included, using a document processing program or the like stored in a PROGRAM ROM of a ROM 3 or an external memory 11.

The CPU 1 collectively controls respective devices connected to a system bus 4. Further, an operating system program (hereinafter, OS), which is a control program of the CPU 1, and the printer drivers described below and the like are stored in the PROGRAM ROM in the ROM 3 or the external memory 11. Therefore, font data to be used when the above-described document processing is performed is stored in a FONT ROM in the ROM 3 or the external memory 11. Also, various data to be used when the above-described document processing or the like is performed is stored in a DATA ROM in the ROM 3 or the external memory 11.

A random access memory (RAM) 2 works as a main memory of the CPU 1, a work area, or the like. A keyboard controller (KBC) 5 controls key input via a keyboard 9 and a pointing device (not illustrated). In this process, settings are made on user interfaces described below through operations of the keyboard 9 and the pointing device.

A display controller 6 controls display of a display unit 10. Hard disks (HDs) store boot programs, various applications, font data, user files, edition files, printer drivers, and the like. A disk controller (DKC) 7 controls access with the external memory 11 such as the above-described hard disks (HDs), floppy disks (FDs), and the like.

A printer controller (PRTC) 8 is connected to the printers 101 to 104 (106 to 109) via the networks 110/105, and executes communication control processing with each of the printers. The CPU 1 executes rasterizing processing of outline fonts to display-information-RAM that has been set on, for example, the RAM 2, and enables WYSIWYG (What You See is What You Get) for displaying the same images as images to be printed on the display unit 10.

Further, the CPU 1 executes various data processing according to a command designated using the mouse cursor. The user opens windows relating to print setting when executing printing operation, and can perform network settings to the printer drivers including settings of the printers, and selection of the print modes.

In the printers 101 to 104 (106 to 109) illustrated in FIG. 2, a printer CPU 12 outputs image signal as output information to a printing unit (printer engine) 17 connected to a system bus 15 according to a control program. In this process, the control program is stored in the external memory 14 or the PROGRAM ROM in the ROM 13.

Further, a control program and the like of the CPU 12 are stored in the PROGRAM ROM in the ROM 13. Font data to be used when the above-described output information is generated and the like are stored in the FONT ROM in the ROM 13. Further, in the case of printers that do not include the external memory 14 such as hard disks, information and the like utilized on the host computer are stored in the DATA ROM in the ROM 13.

The CPU 12 can perform communication processing with the host computer 100 via an input unit 18, and can notify the host computer 100 of information and the like within the printer. A RAM 19 works as a main memory of the CPU 12, and a work area, and memory capacity thereof can be expanded by adding optional RAMs connected to extension ports (not illustrated).

The RAM 19 is used as an output information rasterization region, an environment data storage region, a non-volatile RAM (NVRAM), and the like. Further, the external memory 14 such as the above-described hard disks (HDs), and IC cards is access controlled by a disk controller (DKC) 20.

Furthermore, the external memory 14 is connected as an option, and stores font data, emulation programs, form data, and so forth. Further, in an operation unit 21, switches for operations and LED display device and so forth are arranged.

Further, the above-described external memory 14 is not limited to a single set, but may be provided with a plurality of sets such as option cards, in addition to built-in fonts, and external memories, which have stores programs for interpreting printer control languages in different language systems. Furthermore, the above-described external memory 14 may have the NVRAM (not illustrated), and may store printer mode setting information input via the operation unit 21 therein.

Figure 3:
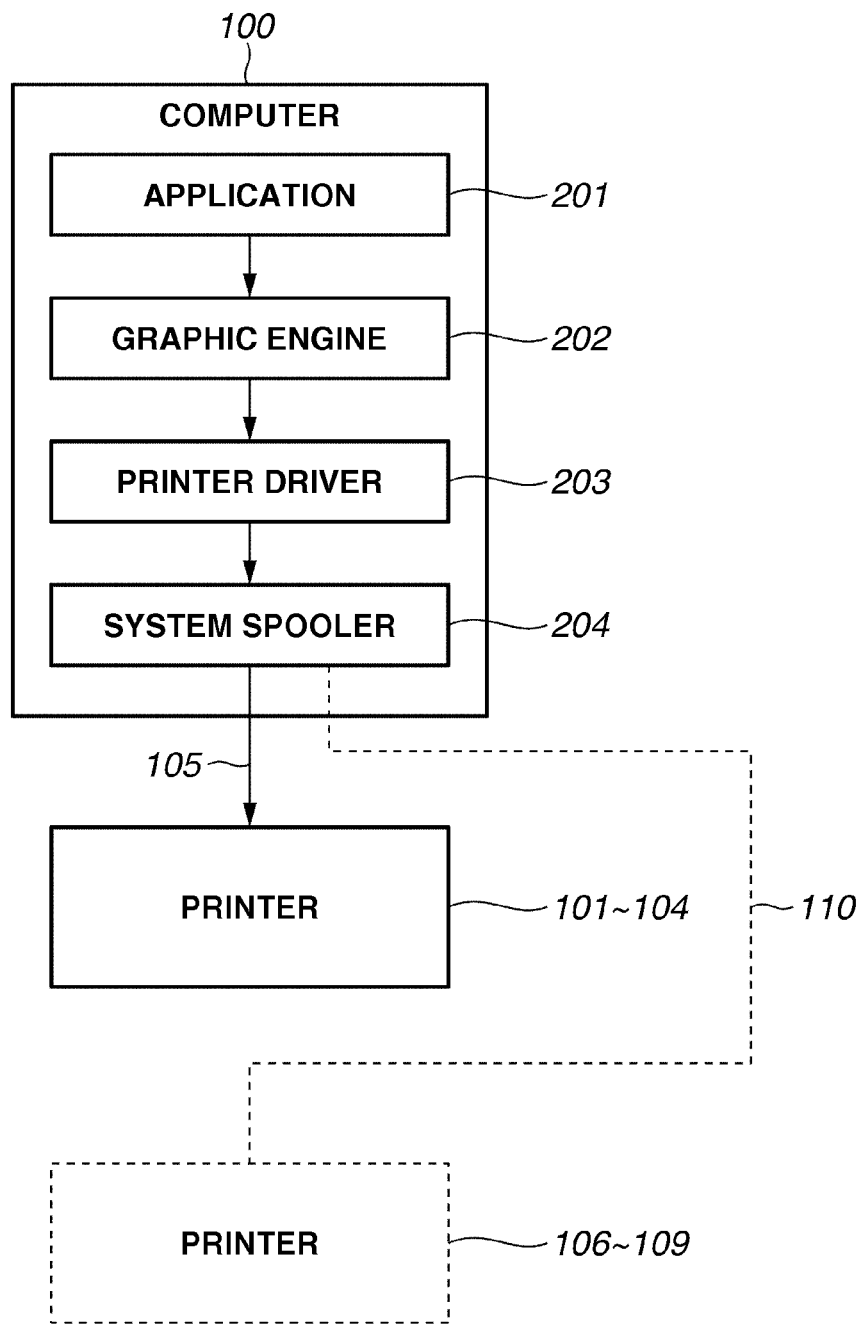
FIG. 3 is a block diagram illustrating a software configuration of a computer.

FIG. 3 is a block diagram illustrating a software configuration of the PC 100 illustrated in FIG. 1. The PC 100 is exclusively connected to the first network 105 and the second network 110, and the PC 100 is not simultaneously connected to the first network 105 and the second network 110. The second network 110 illustrated in FIG. 3 is indicated by a dashed line. This represents a state in which the PC 100 is not currently connected to the second network 110, and the PC 100 is connected to the first network 105 indicated by a solid line.

In FIG. 3, in the PC 100, an application 201, a graphic engine 202, and a printer driver 203, which are stored in the external memory 11, are loaded on the RAM 2, and executed by the CPU 1. A system spooler 204 exists as a file stored in the external memory 11.

Further, the application 201 and the printer driver 203 can be added to an FD and a CD-ROM (not illustrated) in the external memory 11, or to HD in the external memory 11 via a network (not illustrated). However, when printing operation is performed from the application 201 on the printers 101 to 104 or the printers 106 to 109, outputting (rendering) operation is performed by utilizing the graphic engine 202, which has been similarly loaded on the RAM 2 and has become executable.

The graphic engine 202 loads the printer driver 203 similarly from the external memory 11 to the RAM 2, and converts output of the application 201 into a control command of the printer using the printer driver 203. The printer driver is prepared for each of the printers 101 to 104 or the printers 106 to 109.

Then, the printer driver 203 is configured so that the converted printer control command is output to the printers 101 to 104 or the printers 106 to 109 via the system spooler 204 loaded into the RAM 2 by the OS. The converted printer control command is output to the printer via the first network 105 or the second network 110.

The print processing system according to the present exemplary embodiment has a configuration to temporarily spool print data from the application in intermediate code data, in addition to the print processing system including the printers 101 to 104 or the printers 106 to 109 and the PC 100 illustrated in FIG. 3.

Hereinbelow, in the print processing system according to the present exemplary embodiment, the print processing, in the case where a connected network is changed from the first network 105 to the second network 110, will be described. More specifically, a network setting method for automatically setting an output port of printer object name (printer name) that the user has selected using a print setting screen of the printer driver will be described, when printing operation is executed from the application or the like.

Figure 4:
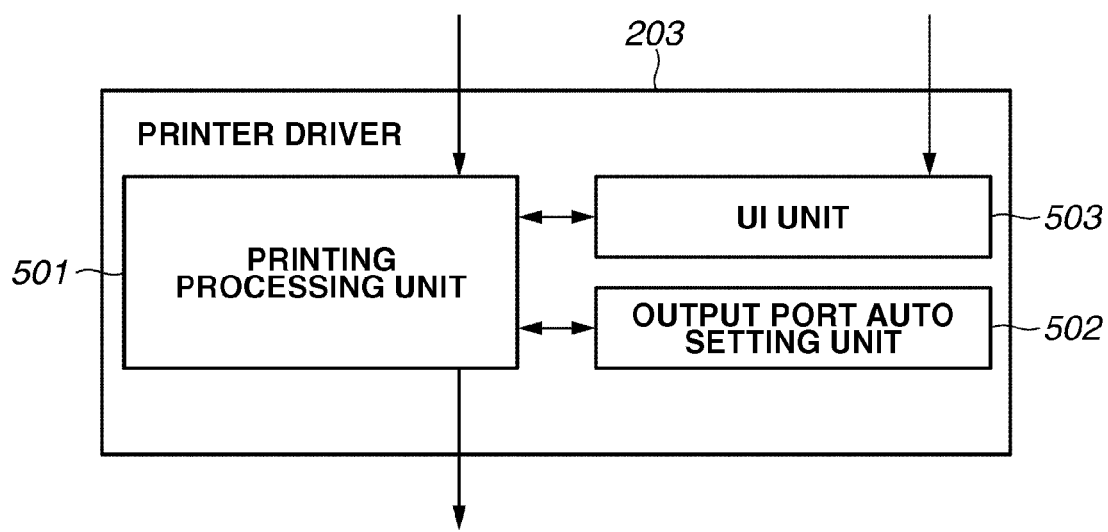
FIG. 4 is a block diagram illustrating a configuration of a printer driver 203.

FIG. 4 is a block diagram illustrating a configuration of the printer driver 203 illustrated in FIG. 3.

In FIG. 4, a print processing unit 501 executes printing, upon receiving the print processing. Further, the print processing unit 501 executes initialization processing, before executing the print processing. An output port auto-setting unit 502 is executed by initialization processing of the print processing unit 501. Therefore, when printing is executed from the application, the output port auto-setting unit 502 is necessarily executed before the print processing unit 501 is started. A user interface (UI) unit 503 controls UI processing, and performs setting of the printer driver and the like.

Figure 5:
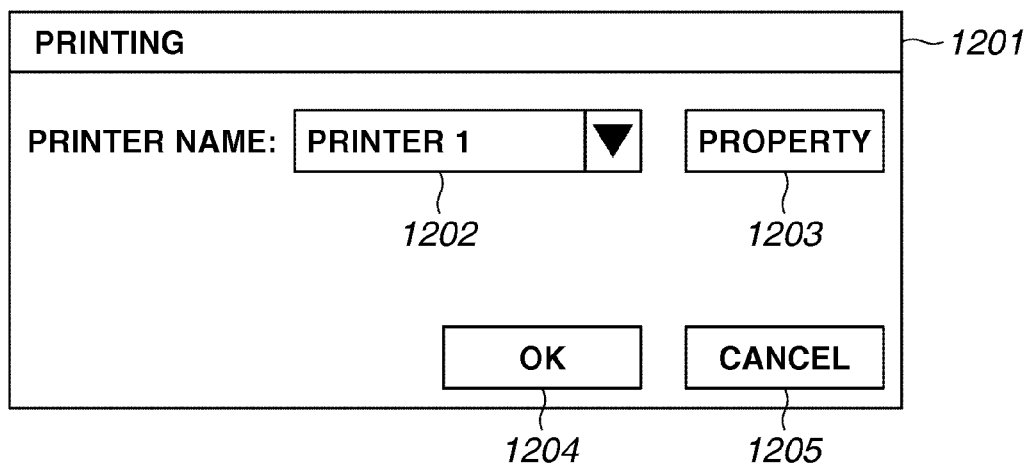
FIG. 5 illustrates an example of user interface (UI) to be displayed on a display unit.

FIG. 5 illustrates an example of user interface displayed on the display unit 10 of the PC 100 illustrated in FIG. 2. The screen corresponds to a print setting/executing screen that the application displays during printing operation.

In FIG. 5, when a printing execution window 1201 of the application receives a print order, the print processing unit 501 is executed, and the print processing is started as the printer driver. Further, in the present exemplary embodiment, the print order is transmitted from the printing execution window 1201. If the print processing is received from other applications and programs and the like, the similar operations are also performed.

A list 1202 is used to select a printer name that executes printing. In this process, a printer name corresponds to a printer object name, and is selected from among printer names that users have registered. The list corresponds to a state in which the user selects a printer 1 as the printer name, in the first network 105.

In this case, the printer 1 as the printer name corresponds to the printer 101 connected to the first network 105. Further, if the user selects the printer 101 as the printer name in the second network 110, the printer 101 corresponds to the printer 106 connected to the second network 110.

However, as described below, if the user moves after having registered the printer 101 on the first network 105, and selects the printer 101 on the second network 110, then the user cannot select appropriate one. Thus, if the printers 106 to 109, for example, correspond to the relevant printer drivers, in association with the printer names at the time of printing, the printer 106, which the user has selected, is registered as the printer 101 in terms of the printer name.

In this case, network information and output port information to be acquired of the second network 110, are to be registered in association with the printer 1.

A property button 1203 is selected by the user, when detail setting of the printer driver is performed. When an OK button 1204 is pressed, the print processing is started, and a print order is transmitted to the printer driver 203. When a cancel button 1205 is pressed, the print execution window 1201 is closed, and the print processing is cancelled.

Figure 6:
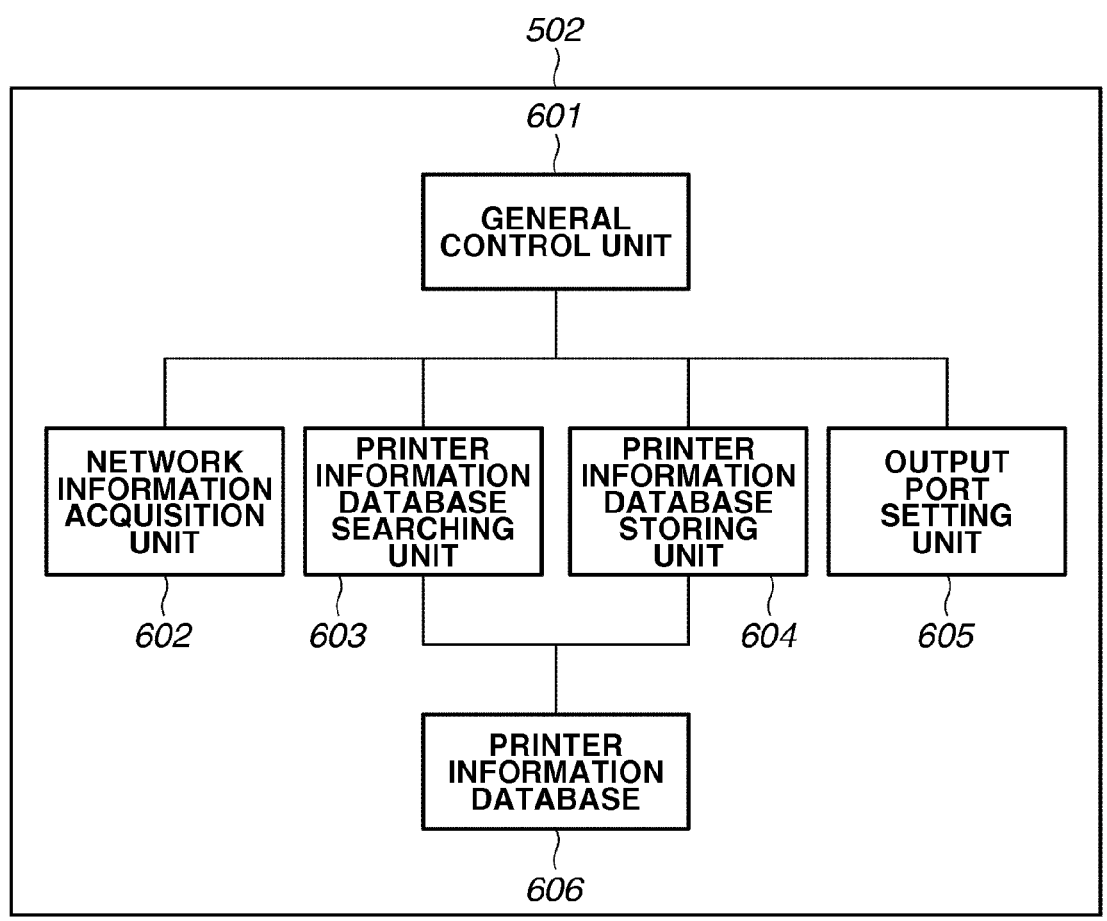
FIG. 6 is a block diagram illustrating a configuration of an auto-setting unit 502 of an output port.

FIG. 6 is a block diagram illustrating a configuration of the output port auto-setting unit 502 illustrated in FIG. 4.

In FIG. 6, the output port auto-setting unit 502 includes a general control unit 601, a network information acquisition unit 602, a printer information database searching unit 603, a printer information database storing unit 604, an output port setting unit 605, and a printer information database 606.

The general control unit 601 controls the entire output port auto-setting unit 502. The network information acquisition unit 602 detects network information (e.g., IP address, subnet mask) of the PC 100 according to instructions from the general control unit 601, and identifies a network to which the PC 100 is connected.

The printer information database searching unit 603 searches the printer information database 606 of an appropriate printer object name using network information or output port information as a key, according to instructions from the general control unit 601. In this process, if there is information to be searched for, the printer information database searching unit 603 returns it to the general control unit 601, and if there is no information to be searched for, notifies the general control unit 601 accordingly.

The printer information database storing unit 604 creates printer information (see FIG. 8) in which the network information and the output port information are paired, according to instructions from the general control unit 601, and stores appropriate printer object in the printer information database 606.

The output port setting unit 605 performs processing for changing setting value of output port to designated output port, with respect to designated printer object, according to instructions from the general control unit 601.

The printer information database 606 is created for each printer object name, and performs processing such as store, delete, change, and search using the printer object name as the key. In this process, the printer information database 606 can store a plurality of the output port information and the network information as the printer information associated with the printer names.

Figure 7:
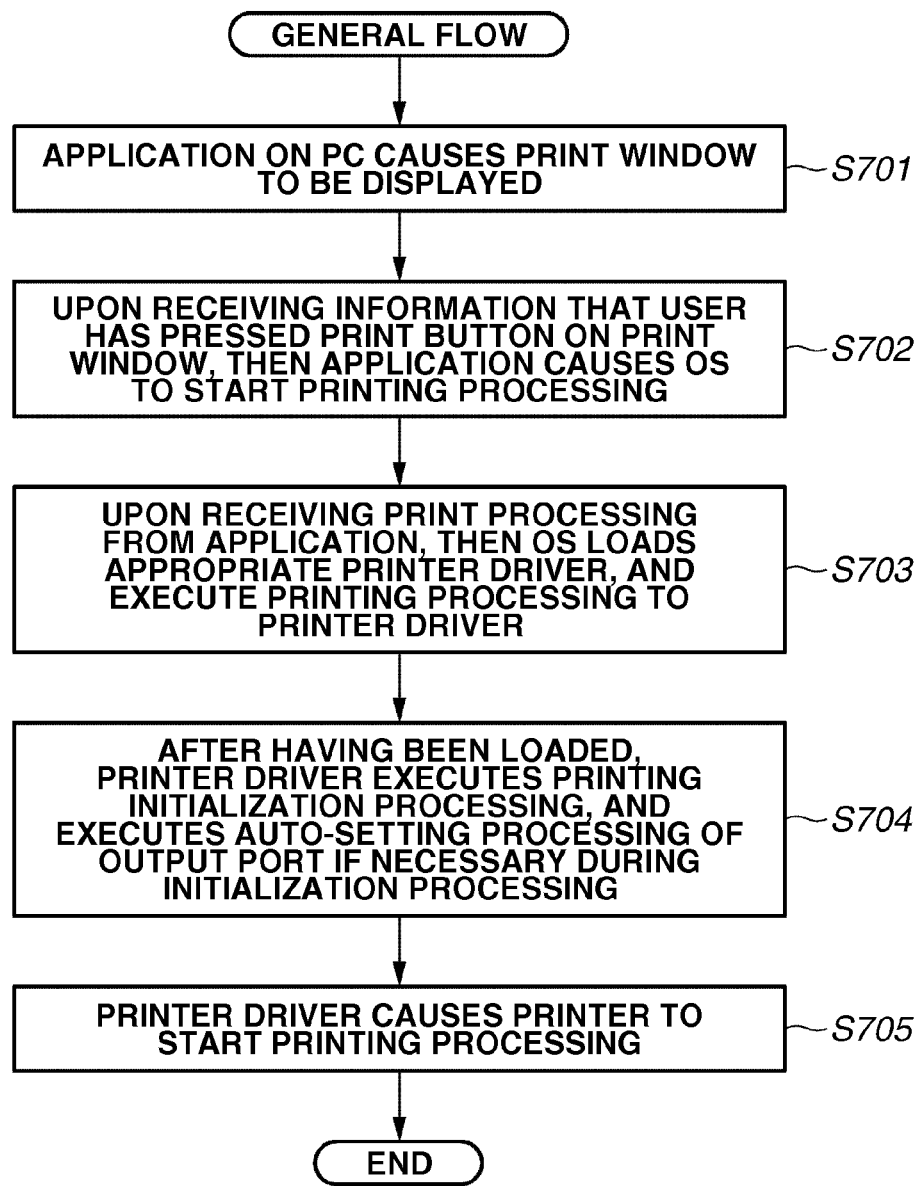
FIG. 7 is a flowchart illustrating a data processing procedure of an information processing apparatus.

FIG. 7 is a flowchart illustrating an example of data processing procedure of the information processing apparatus according to the present exemplary embodiment. The procedure corresponds to a procedure for describing a flow of the print processing in the information processing apparatus. Respective steps are implemented by the CPU 1 by loading the system program, the printer driver, and the control program stored in the ROM 3 and the external memory 11, on the RAM 2 and executing them.

Firstly, in step S701, the application on the PC 100 causes a print window, which is a window for print setting at the time of printing, to be displayed on the display unit 10. Then, in step S702, upon receiving information that the user has pressed a print button of the print window, then the application causes OS to start the print processing.

Next, in step S703, upon receiving print processing from the application, then the OS loads appropriate printer driver, and brings it into executable state, and subsequently starts the print processing to the printer driver. Next, in step S704, after having been loaded from the OS, the printer driver executes printing initialization processing, and executes auto-setting processing of the output port described below during the initialization processing. If necessary, the printer driver executes the auto-setting of the output port.

Then, in step S705, after the printer driver has completed the initialization processing, the OS receives rendering information. Then, the printer driver executes print processing, causes a printer assigned to an output port to start print processing for controlling print information to be output, and ends the processing.

Next, the operation of the output port auto-setting unit 502 illustrated in FIG. 4 will be described with reference to FIG. 8.

Figure 8:
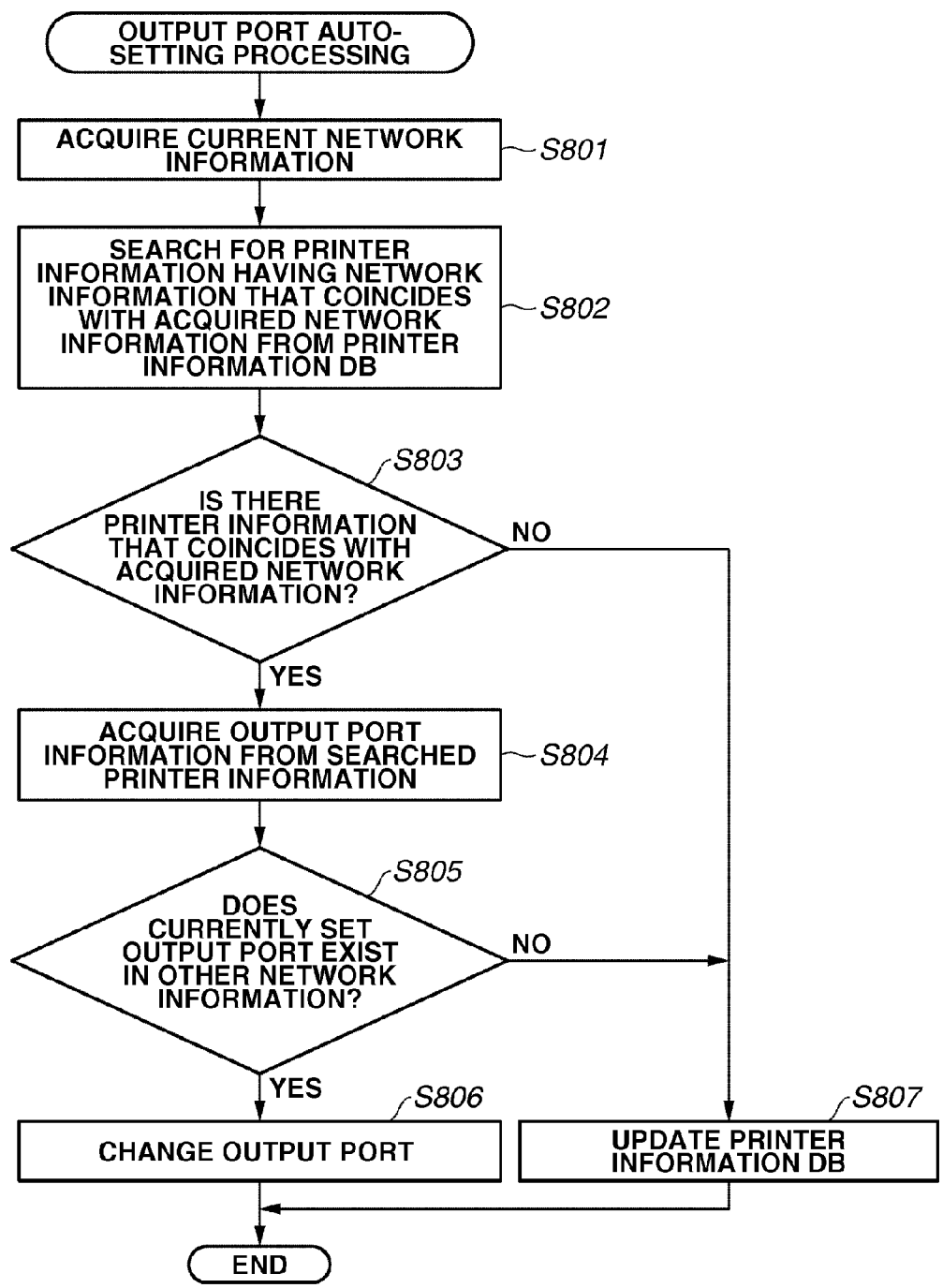
FIG. 8 is a flowchart illustrating a data processing procedure of the information processing apparatus.

FIG. 8 is a flowchart illustrating an example of data processing procedure in the information processing apparatus according to the present exemplary embodiment. The example is a data processing example of the output port auto-setting unit 502 performed in step S704 illustrated in FIG. 7. Each of the steps S801 to S807 is implemented by the CPU 1 by loading and executing the system program and the printer driver, which are stored in the ROM 3 and the external memory 11, on the RAM 2.

Modules corresponding to the functions of the output port auto-setting unit 502 are recorded as a portion of a program of the printer driver 203 and loaded at the same time when the printer driver 203 is loaded. Further, the modules corresponding to the functions of the output port auto-setting unit 502 are executed in the general control unit 601 of the output port auto-setting unit 502 illustrated in FIG. 6.

Firstly, in step S801, the general control unit 601 instructs a network information acquisition unit 602 to acquire network information to which the PC 100 is connected. In the present exemplary embodiment, the PC 100 is connected to either the second network 110 or the first network 105 illustrated in FIG. 1.

Next, in step S802, the general control unit 601 instructs the printer information database searching unit 603 to search for printer information having network information that coincides with the network information that the printer information database searching unit 603 has acquired in step S801. In this process, the general control unit 601 searches for printer information from the printer information database 606. At this time, the printer information database searching unit 603 searches for the one that coincides with a printer object name of a call source from among the printer information database 606.

Next, in step S803, the general control unit 601 determine whether there is printer information that coincides with the network information that the network information acquisition unit 602 has acquired, through search processing by the printer information database searching unit 603. If the general control unit 601 determines that there is coincident printer information (YES in step S803), the processing proceeds to step S804. On the other hand, if the general control unit 601 determines that there is no coincident printer information (NO in step S803), the processing proceeds to step S807.

Next, in step S804, the general control unit 601 acquires output port information from the printer information that the printer information database searching unit 603 has searched.

Next, in step S805, the general control unit 601 acquires the output port set to the printer object that issues printing instruction, and instructs the printer information database searching unit 603 to search the printer information database 606 to check if there is coincident output port.

This is because, if there is the coincident output port, it is determined as the output port previously set in the present processing. On the other hand, if there is no coincident output port, it is determined as the output port previously not changed in the present processing, and accordingly the output port will not be changed. Therefore, if the general control unit 601 determines as coincident output port (YES in step S805), the processing proceeds to step S806. If the general control unit 601 determines as non-coincident output port (NO in step S805), the processing proceeds to S807.

Next, in step S806, the general control unit 601 instructs the output port setting unit 605 to change the output port of the printer object that issues printing instruction to the output port acquired in step S804, and ends the processing.

On the other hand, in step S807, the general control unit 601, by associating the current output port with the current network information, instructs the printer information database storing unit 604 to store them in the printer information database 606, and ends the processing.

FIGS. 9A and 9B illustrates data structure of the printer information to be stored in the printer information database 606 illustrated in FIG. 6. FIG. 9A illustrates printer information 800 corresponding to the first network 105, and FIG. 9B illustrates printer information 810 corresponding to the second network 110. The printer information is registered in association with each printer object name.

In this regard, the printer object name corresponds to the printer name that the user selects, in a print start screen that the printer driver provides. Further, since the relevant printer name is an imaginary printer name, it is physically one printer, but it is possible for the user to set an arbitrary printer name as a plurality of logic printers with varying print settings.

In FIG. 9, the network information 801 is information for identifying the networks, and includes IP address, subnet mask, and gateway address assigned to the PC 100, when FIG. 1 is taken as an example. As the network information 801, any information other than the above-described one can be used, as long as the information can uniquely identify the network. Output port information 805 is the output port information of the printer to be used for outputting in the network identified by the network information 801.

The output port information 805 corresponds to any one of the printers 101 to 104 on the first network 105. When the user uses all of the printers 101 to 104, four pieces of output port information are registered in the printer information database 606 in association with the first network 105. However, it is possible for the user to select all of the printers 101 to 104, but since the user actually selects necessary printer, the printer information is registered in association with the printer name corresponding to the selected printer.

Further, printer information 810 includes network information 811. The network information 811 corresponds to any one of the printers 106 to 109 on the second network 110. When the user uses all of the printers 106 to 109, four pieces of output port information are registered in the printer information database 606 in association with the second network 110.

Further, similar to the above description, it is possible for a user to select all of the printers 106 to 109, but the user actually selects necessary printer. Therefore, the printer information is registered in association with the printer name corresponding to the selected printer.

What values are specifically entered into the printer information data will be described taking an environment illustrated in FIG. 1 as an example.

It is assumed that, when the PC 100 is connected to the first network 105, the printer 101 is selected to perform printing, and when the PC 100 is connected to the second network 110, the printer 109 performs printing. In this case, information for identifying the first network 105 is entered into the first data of the printer information database 606, as the network information.

More specifically, when the PC 100 is connected to the first network 105, the IP address, subnet mask, and gateway address that have been set for the PC 100 are set as the network information. Further, the output port name for outputting to the printer 101 is set as the output port information.

For the next data of the printer information database 606, the IP address, subnet mask, and gateway address that have been set for the PC 100 are set as the network information, when connected to the second network 110, so that the network information identifies the second network 110. Further, the output port name for outputting to the printer 109 is set as the output port information.

Next, processing for automatically setting the output port will be specifically described referring FIG. 1 and FIG. 9. An IP address 802 when the PC 100 is connected to the first network 105 is assumed to be "192.168.11.50", a subnet mask 803 is assumed to be "255.255.255.0", and a gateway address 804 is assumed to be "192.168.11.2". Further, output port information 805 corresponding to the printer 101 that performs printing in the first network 105 is "IP__192.168.11.11", and the relevant output port is set to the printer name that the printer driver manages.

When the user performs printing on the first network 105 for the first time, appropriate printer information does not exist in the printer information database 606 that the printer driver manages. Therefore, the general control unit 601 creates printer information 800 as illustrated in FIG. 9A, and registers them in the printer information database 606. In this process, since it is the first network connection, changing processing of the output port is not performed.

Next, the user disconnects the PC 100 that was connected to the first network 105, and moves to an area where the second network 110 is installed, for example, conference room, while carrying the PC 100. Then, the user connects the PC 100 to the second network 110. The network may be wired network, or wireless network.

In this case, the IP address designated when the PC 100 is connected to the second network 110 is assumed to be "192.168.100.5", the subnet mask to be "255.255.255.0", and the gateway address to be "192.168.100.1". Further, the output port corresponding to the printer 109 that performs printing on the second network 110 is "IP__192.168.100.100", and the output port is set to the printer object.

In this process, when the user connects the PC 100 to the second network 110 for the first time, and performs printing, appropriate printer information does not exist in the printer information database 606 that the printer driver 203 manages. Therefore, the general control unit 601 creates the printer information 810 as illustrated in FIG. 9B, and registers them in the printer information database 606. In this process, changing processing of the output port is not performed.

At this time, as illustrated in FIG. 9B, "192.168.100.5" is registered in IP address 812 as the printer information 810. Further, "255.255.255.0" in subnet mask 813, and 814 "192.168.100.1" in gateway address are registered on the printer information database 606. Further, "IP__192.168.100.100" is registered in the output port 815 on the printer information database 606.

Next, again, the user disconnects the PC 100 that was connected to the second network 110, and moves to an area where the first network 105 is installed, while carrying the PC 100. In this process, if it is a wired network, the user disconnects a network cable connected to the PC 100 from a router or the like. Further, if it is a wireless network, the user moves outside an area of the second network 110, while simply carrying the PC 100.

After such a work, the user moves to the area of the first network 105, while carrying the PC 100, and connects the PC 100 again to the first network 105. Connection processing in the case of wired network, and in the case of wireless network will be the similar procedure to the above-described one. The network information relating to the first network 105 is assumed to be similar to the one at the time of the preceding connection. In this state, if the user executes printing from the PC 100, an output port changing processing is executed at the time of initialization processing of the printer driver.

Firstly, network information of the first network 105, to which the PC 100 is connected, is acquired by the network information acquisition unit 602. In this process, with the similar procedure to the one at the time of the preceding connection, "192.168.11.50" is acquired for IP address by the network information acquisition unit 602, as illustrated in FIG. 9A. Further, "255.255.255.0" is acquired for the subnet mask, and "192.168.11.2" is acquired for the gateway address.

Based on the network information, when the printer information database searching unit 603 searches the printer information database 606, it searches for the printer information 800. Therefore, at a timing before execution of printing, the output port setting unit 605 changes the setting of "IP__ 192.168.11.11", which has been set to the output port information 805 of the printer information 800, to the output port of the printer object.

In a state before the changing of the setting, that is, in a state immediately after connection to the first network 105 after connection to the second network 110 is released, the output port of the printer object remains in a state where the network information of the second network 110 is set. Thus, the above-described initialization processing is executed before printing is started, and the printer name corresponding to the network information of the first network 105 is changed to the output port information of the printer 1.

According to the present exemplary embodiment, the user may move freely between the first network and the second network, while carrying the PC 100, and perform printing. In such a case, when the user selects the printer name, before printing is started, then setting of the output port, which the printer driver manages, is changed in association with a connection destination of the network. Accordingly, the user can build a comfortable printing environment in which the works such as confirming settings of the networks, and changing, re-changing and the like can be reduces, which occur each time the user moves between the networks. As a result, the user can execute print processing, without recognizing the difference in environments of the networks.

In the above-described exemplary embodiment, description has been made when the user moves between the first and the second networks as an example. As a matter of course, also in the case where the user moves between more than two networks, settings of the network information are automatically defined.

In the above-described first exemplary embodiment, description has been given about the following case where when the processing is always performed at the time of printing in the output port auto-setting unit 502, and it is determined that the printer driver needs to change settings, then the output port is automatically changed through a function of the printer driver. However, when the print setting is performed from the application 201 to the printer driver 203, outputting to the output port would be rather supposedly better, like a print with security, for example.

Figure 10:
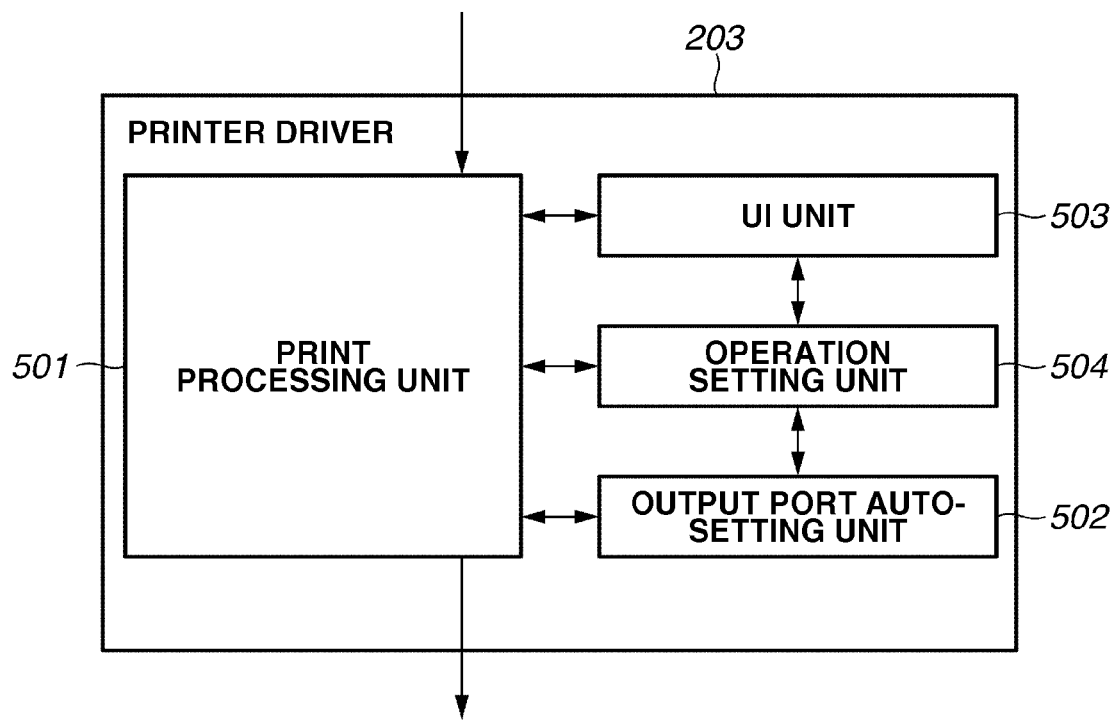
FIG. 10 is a block diagram illustrating a configuration of a printer driver.

Thus, the printer driver 203 may be configured so that, the operation setting unit 504 illustrated in FIG. 10 is provided between the output port auto-setting unit 502 and the UI unit 503, and the print setting processing that does not accompany the output port auto-setting processing can be set from setting UI of the UI unit 503 of the printer driver 203. Hereinbelow, the exemplary embodiment will be described.

FIG. 10 is a block diagram illustrating a configuration of the printer driver of the information processing apparatus according to the present exemplary embodiment. In FIG. 10, an operation setting unit 504 performs setting for prohibiting auto-setting of the output port. In the present exemplary embodiment, pre-processing of output port auto-setting illustrated in FIG. 11 is executed before starting auto-setting processing of output port illustrated in FIG. 8.

Figure 11:
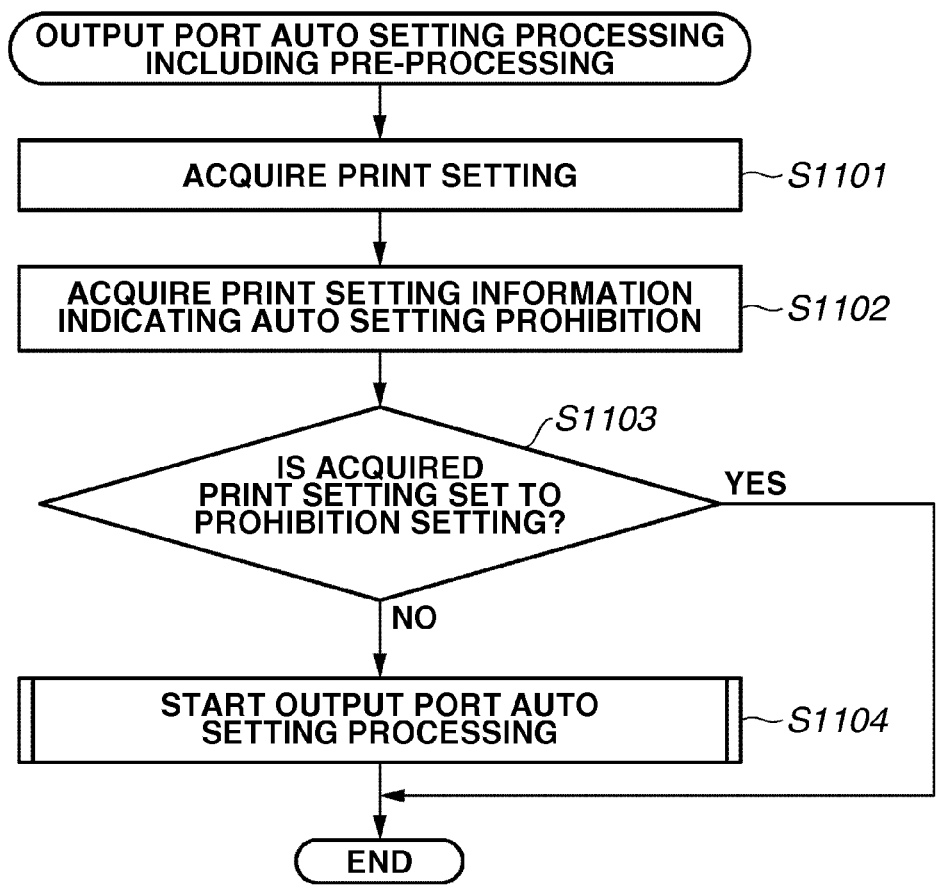
FIG. 11 is a flowchart illustrating a data processing procedure of the information processing apparatus.

FIG. 11 is a flowchart illustrating an example of data processing procedure of the information processing apparatus according to the present exemplary embodiment. The procedure is a data processing example of the output port auto-setting unit 502 in step S704 illustrated in FIG. 7, and includes pre-processing. Respective steps S1101 to S1104 are implemented by the CPU 1 by loading the system program and the printer driver stored in the ROM 3 and the external memory 11, into the RAM 2, and executing them.

Modules corresponding to the functions of the output port auto-setting unit 502 are recorded as a portion of the program of the printer driver 20, and are loaded at the same time when the printer driver 203 is loaded. Further, the modules corresponding to the functions of the output port auto-setting unit 502 are executed in the general control unit 601 of the output port auto-setting unit 502 illustrated in FIG. 6.

Firstly, in step S1101, the general control unit 601 acquires print setting from the printer driver 203. Next, in step S1102, the general control unit 601 acquires print setting information indicating auto-setting prohibition from the operation setting unit 1004.

In this process, since print setting information may be any information as long as it can be used to discriminate whether or not the auto-setting of the output port is prohibited, it is only necessary to expand the printer information 800 and 811, and to store them as information indicating ON/OFF of prohibition flag. Further, a radio button is added on a print setting screen that the printer driver provides. It is only necessary for the operation setting unit 504 to set ON/OFF (valid or invalid) of the prohibition flag, from selection state of the radio button.

Next, in step S1103, the general control unit 601 compares the print setting acquired in step S1101 and the auto-setting prohibition acquired from an operation setting unit 1004, and determines whether print setting acquired in step S1101 is set to prohibition auto-setting. In this process, if the general control unit 601 determines that the print setting acquired in step S1101 is not set to prohibition setting (NO in step S1103), in step S1104, the general control unit 601 starts output port auto-setting processing illustrated in FIG. 8, and ends the processing.

On the other hand, in step S1103, if it is determined that the print setting acquired in step S1101 is set to prohibition setting (YES in step S1103), the general control unit 601 ends the processing, without executing the output port auto-setting processing illustrated in FIG. 8.

According to the present exemplary embodiment, it can be determined whether the auto-setting of the output port is executed, depending on whether a user sets to prohibition print setting. As a result, if there is no need to perform the auto-setting of the output port, just changing the print setting is enough. Accordingly, print setting information appropriate for the user's requirement can be changed or prohibited, and the user's convenience is improved.

In the first exemplary embodiment described above, the case where printer information is registered for each name (printer name) of printer object in the printer information database 606 has been described. Accordingly, if the printer name is changed, setting of the previous printer name cannot be utilized.

Thus, when the printer information is registered in the printer information database 606, it is registered not only for each printer name, but also as the printer driver in the printer information database 606. Further, operation modes are added to the output port auto-setting unit 502. In this process, the operation modes are set by an operation setting unit 504 illustrated in FIG. 10. Further, the operation modes can be set in three patterns, namely, a first operation mode, a second operation mode, and a third operation mode.

In the above-described first operation mode, a processing similar to that in the first exemplary embodiment is performed. When the printer information database 606 is searched, in the second operation mode, processing of searching the printer information database registered as the printer drivers is performed, rather than using the printer information database for each printer object name.

In the third operation mode, as a result of searching the printer information database by printer object name similar to the first operation mode, if there is no coincident printer information, a processing of searching the printer information database registered as printer drivers is performed, similar to the second operation mode.

The operation modes are configured so that the user can select any operation mode with the radio button through detailed setting of the print setting screen that the printer driver provides. However, the operation modes are not limited to such a configuration, and they may be configured so that a server on a network can set the operation mode.

FIG. 12 is a flowchart illustrating an example of data processing procedure of the information processing apparatus according to the present exemplary embodiment. The present procedure is a data processing example of the output port auto-setting unit 502 performed in step S704 in FIG. 7. Respective steps in S1201 to S1212 are implemented by the CPU 1 by loading the system program and the printer driver, which are stored in the ROM 3 and the external memory 11, on the RAM 2 and executing them.

The modules corresponding to the functions of the output port auto-setting unit 502 are recorded as a portion of a program of the printer driver 203, and are loaded simultaneously when the printer driver 203 is loaded. Further, the modules corresponding to the functions of the output port auto-setting unit 502 are executed by the general control unit 601 of the output port auto-setting unit 502 illustrated in FIG. 6.

Firstly, in step S1201, the general control unit 601 instructs the network information acquisition unit 602 to acquire network information, to which the PC 100 is connected.

Next, in step S1202, in order to branch the processing depending on the operation mode, the general control unit 601 determines whether the operation mode has been set to any one of the first to third operation modes. In this process, if it is determined that the first operation mode has been set, the processing proceeds to step S1203. Further, if it is determined that the second operation mode has been set, the processing proceeds to step S1204. Furthermore, if it is determined that the third operation mode has been set, the processing proceeds to step S1205.

Then, in step S1203, the general control unit 601 instructs the printer information database searching unit 603 to search for printer information having the network information that coincides with the network information acquired in step S1201, from among the printer information database 606. In this case, the printer information database searching unit 603 searches for printer information that coincides with printer object name of call source from the printer information database 606, and the processing proceeds to step S1208.

Further, in step S1204, the general control unit 601 instructs the printer information database searching unit 603 to search for printer information having network information that coincides with the network information acquired in step S1201, from among the printer information database 606. In this case, the printer information database searching unit 603 searches the printer information database 606 that has registered printer information as printer driver information, and the processing proceeds to step S1208.

Furthermore, in step S1205, the general control unit 601 instructs the printer information database searching unit 603 to search for printer information having network information that coincides with the network information acquired in step S1201, from among the printer information database 606. In this case, the printer information database searching unit 603 searches for printer information that coincides with the printer object name of call source.

Next, in step S1206, the general control unit 601 determines whether there is coincident printer information as a result of searching in step S1205. In this process, if the general control unit 601 determines that there is coincident printer information (YES in step S1206), the processing proceeds to step S1208. On the other hand, if the general control unit 601 determines that there is no coincident printer information (NO in step S1206), the processing proceeds to step S1207.

Next, in step S1207, the general control unit 601 instructs the printer information database searching unit 603 to search for printer information having network information that coincides with the network information acquired in step S1201, from among the printer information database 606. In this case, the printer information database searching unit 603 searches the printer information database 606 that has registered printer information as printer driver information.

Next, in step S1208, the general control unit 601 determines whether there is coincident printer information as a result of searching in pre-processing. In this process, if the general control unit 601 determines that there is coincident printer information (YES in step S1208), the processing proceeds to step S1209. On the other hand, if the general control unit 601 determines that there is no coincident printer information (NO in step S1208), the processing proceeds to step S1212.

Then, in step S1209, the general control unit 601 acquires output port information from the coincident printer information. Next, the general control unit 601 acquires output port that is set to printer object that issues the printing instruction, and instructs the printer information database searching unit 603 to search for coincident output port.

Then, in step S1210, the general control unit 601 determines whether output port that is currently set exists in other network information. Thus is because, if there is coincident output port, it is determined as output port that has been previously set in the present processing. On the other hand, if there is no coincident output port, it is determined as output port that has not been changed in the present processing, the output port will not be changed.

In this process, if the general control unit 601 determines that coincident output port exists (YES in step S1210), the processing proceeds to step 1211. On the other hand, if the general control unit 601 determines that coincident output port does not exists (NO in step S1210), the processing proceeds to step S1212.

Then, in step S1211, the general control unit 601 instructs the output port setting unit 605 to change the output port of the printer object that issues printing instruction to the output port acquired in step S1209, and ends the present processing.

On the other hand, in step S1212, the general control unit 601 issues instructions to the printer information database storing unit 604 to store printer information while associating current output port with current network information, and ends the present processing.

According to the above-described exemplary embodiments, the printer information database 606, which has registered as the printer drivers, is searched according to the first to third operation modes. Even if a user has changed the name of the printer object, by performing such an operation, in the case where the user moves between the networks while carrying the PC 100 and performs operation to connect the PC 100 to each network, an output port for utilizing a printer connected to the network can be set automatically.

According to the exemplary embodiments of the present invention, even if the user moves between the networks while carrying the PC 100, and connects it to each network, the output port setting corresponding to the printer name that the user selects can be automatically performed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-069562 filed Mar. 23, 2009, which is hereby incorporated by reference herein in its entirety.

What is claimed is:

1. An information processing apparatus comprising:
an acquisition unit configured to acquire network information pertaining to the information processing apparatus after printing is instructed;
a storage unit configured to store the network information pertaining to the information processing apparatus and output port information corresponding to an image forming apparatus as printer information;
a determination unit configured to determine whether the network information that the acquisition unit has acquired exists in the printer information stored by the storage unit; and
a changing unit, if the determination unit determines that the network information exists in the printer information stored by the storage unit, configured to change output port information set to a printer object selected by a user to the stored output port information corresponding to the network information acquired by the acquisition unit.

2. The information processing apparatus according to claim 1, further comprising:
a setting unit configured to set a change of the output port information to either valid or invalid by the changing unit,
wherein the changing unit, if the change of the output port information is set to the invalid by the setting unit, is configured not to change an output port.

3. The information processing apparatus according to claim 1, wherein the storage unit stores the network information acquired by the acquisition unit and the output port information set to the printer object selected by the user so as to be associated with the acquired network information, in a case where the determination unit determines that the network information acquired by the acquisition unit does not exist in the printer information stored by the storage unit.

4. The information processing apparatus according to claim 1, wherein the printer information is created for each printer object name.

5. A network setting method utilized in an information processing apparatus, wherein the information processing apparatus includes an acquisition unit, storage unit, determination unit, and changing unit, the network setting method comprising:
via the acquisition unit, acquiring network information pertaining to the information processing apparatus, after printing has been instructed;
via the storage unit, storing the network information pertaining to the information processing apparatus and output port information corresponding to an image forming apparatus as printer information associated with a printer name in the storage unit;
via the determination unit, determining whether the acquired network information that is stored in the storage unit as the printer information associated with the printer name selected by a user; and
via the changing unit, if the determination unit determines that the network information exists in the printer information stored by the storage unit, changing output port information set to a printer object selected by the user to the stored output port information corresponding to the network information acquired by the acquisition unit.

6. The network setting method according to claim 5, further comprising:
via a setting unit, setting a change of the output port information to either valid or invalid,
wherein, if the change of the output port information is set to the invalid, the change of an output port is not performed.

7. The network setting method according to claim 5, wherein the storage unit stores the network information acquired by the acquisition unit and the output port information set to the printer object selected by the user so as to be associated with the acquired network information, in a case where the determination unit determines that the network information acquired by the acquisition unit does not exist in the printer information stored by the storage unit.

8. The network setting method according to claim 5, wherein the printer information is created for each printer object name.

9. A non-transitory computer readable storage medium containing computer-executable instructions for controlling an information processing apparatus, the medium comprising:

computer-executable instructions that, via an acquiring unit, acquire network information pertaining to the information processing apparatus, after printing has been instructed;

computer-executable instructions that, via a storage unit, store the acquired network information pertaining to the information processing apparatus and output port information corresponding to an image forming apparatus as printer information in the storage unit;

computer-executable instructions that, via a determining unit, determine whether the acquired network information exists in the printer information stored by the storage unit; and computer-executable instructions that, if it is determined that the network information exists in the printer information stored by the storage unit, changing output port information set to a printer object selected by a user to the stored output port information corresponding to the network information acquired by the acquiring unit.

10. The storage medium according to claim 9, the medium further comprising:

computer-executable instructions that, via a setting unit, execute setting of change of the output port information to either valid or the invalid, and wherein, if the change of the output port information is set to invalid, the change of output port is not performed.

* * * * *